United States Patent
Morimura

(10) Patent No.: US 9,656,628 B2
(45) Date of Patent: May 23, 2017

(54) OCCUPANT DETECTION APPARATUS AND SEAT BELT ABNORMALITY DETERMINATION APPARATUS

(71) Applicant: TOYOTA JIDOSHA KABUSHIKI KAISHA, Toyota-shi, Aichi-ken (JP)

(72) Inventor: Junichi Morimura, Suntoh-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/937,184

(22) Filed: Nov. 10, 2015

(65) Prior Publication Data

US 2016/0137162 A1   May 19, 2016

(30) Foreign Application Priority Data

Nov. 18, 2014   (JP) .................................. 2014-233667

(51) Int. Cl.
| | | |
|---|---|---|
| *B60R 22/48* | (2006.01) | |
| *B60N 2/00* | (2006.01) | |
| *B60R 22/34* | (2006.01) | |
| *B60R 22/41* | (2006.01) | |
| *B60R 22/195* | (2006.01) | |

(52) U.S. Cl.
CPC .............. *B60R 22/48* (2013.01); *B60N 2/002* (2013.01); *B60R 22/41* (2013.01); *B60R 2022/1957* (2013.01); *B60R 2022/4816* (2013.01); *B60R 2022/4858* (2013.01)

(58) Field of Classification Search
CPC . B60R 22/48; B60R 22/41; B60R 2022/4858; B60R 2022/4816; B60R 2022/1957; B60N 2/002

USPC .............. 701/34.4, 70; 340/457.1; 242/379.1
See application file for complete search history.

(56) References Cited

U.S. PATENT DOCUMENTS

| | | | | |
|---|---|---|---|---|
| 6,257,363 B1 * | 7/2001 | Midorikawa | ........... | B60R 22/44 180/268 |
| 2002/0110261 A1 * | 8/2002 | Yanai | ................. | B60R 21/0132 382/104 |
| 2012/0318904 A1 * | 12/2012 | Ukita | ................. | B60R 22/3413 242/379.1 |
| 2013/0257608 A1 * | 10/2013 | Larice | ..................... | B60Q 9/00 340/438 |

(Continued)

FOREIGN PATENT DOCUMENTS

| | | | |
|---|---|---|---|
| EP | 2653354 A1 * | 10/2013 | |
| JP | H11-321562 | 11/1999 | |

(Continued)

*Primary Examiner* — Marthe Marc-Coleman
(74) *Attorney, Agent, or Firm* — Finnegan, Henderson, Farabow, Garrett & Dunner, LLP

(57) ABSTRACT

An occupant detection apparatus, installed in a vehicle, including a seat belt configured to be extendable and rewindable, and to be worn by an occupant sitting on a seat of a vehicle, and a motor configured to rewind the seat belt, includes a counter electromotive force determination unit configured to determine whether a counter electromotive force is generated in the motor; and an occupant determination unit configured to determine whether the occupant sitting on the seat in the vehicle is wearing the seat belt, based on a determination result by the counter electromotive force determination unit while the vehicle is traveling.

4 Claims, 3 Drawing Sheets

(56) References Cited

U.S. PATENT DOCUMENTS

2013/0278409 A1* 10/2013 Odate ..................... B60Q 1/00
340/457.1
2014/0257661 A1* 9/2014 Schulman ............... B60R 22/48
701/70

FOREIGN PATENT DOCUMENTS

| JP | H11-342831 A | 12/1999 |
| JP | 2008-247358 | 10/2008 |
| JP | 2013-063696 A | 4/2013 |

* cited by examiner

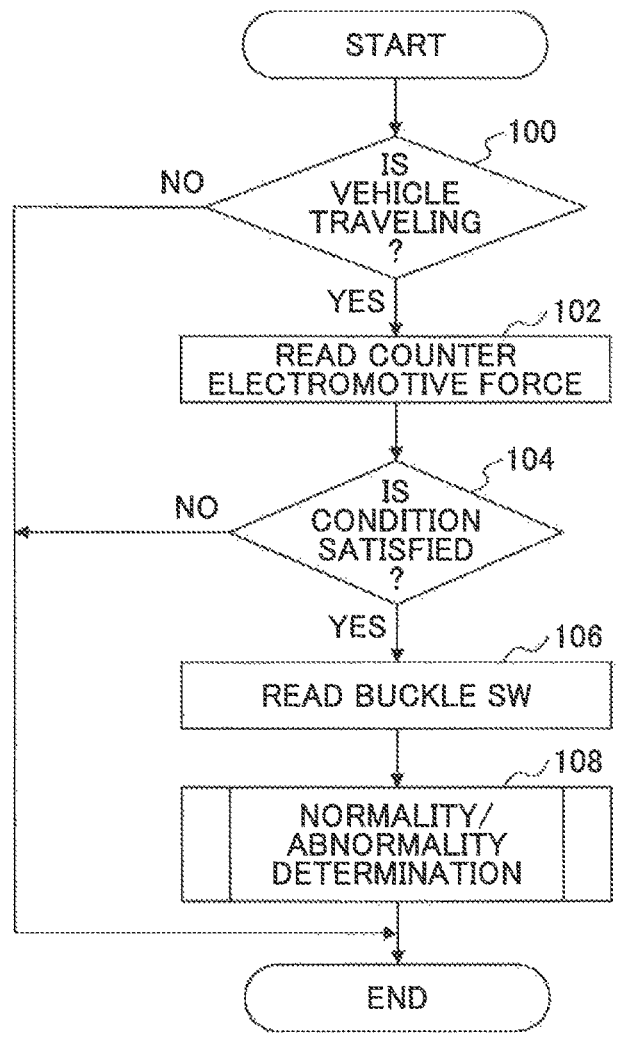

OCCUPANT DETECTION APPARATUS AND SEAT BELT ABNORMALITY DETERMINATION APPARATUS

FIELD

The disclosures herein generally relate to an occupant detection apparatus that is suitable for determining whether an occupant sitting on a seat of a vehicle is wearing the seat belt, and a seat belt abnormality determination apparatus that is suitable for determining whether the seat belt is In an abnormal state.

BACKGROUND

Conventionally, an apparatus has been known that determines whether an occupant is wearing the seat belt, and whether the seat belt is in an abnormal state (see, for example, Patent Document 1). This apparatus includes a buckle connection. detection mechanism that determines whether the buckle of the seat belt is released. If the buckle connection detection mechanism determines that the buckle is released to be in a non-connection state, this apparatus determines that the occupant does not wear the seat belt. On the other hand, if the buckle connection detection mechanism determines that the buckle is inserted to be in a connection state, this apparatus determines that the occupant is wearing the seat belt.

The apparatus also includes a motor to rewind the sear belt, and a calculation unit to determine whether the seat belt has been pulled out. The calculation unit determines that the seat belt has been pulled out if detecting that a counter electromotive force has been generated in the motor. Then, after the calculation unit has determined that the seat belt has been pulled out, if the apparatus determines that the seat belt is not worn after a predetermined time has passed, by using the buckle connection detection mechanism, the apparatus determines that the seat belt is in an abnormal state.

RELATED-ART DOCUMENTS

Patent Documents

[Patent Document 1] Japanese Laid-open Patent Publication No. 2008-247358

However, the apparatus described in Patent Document 1 determines whether the seat belt is worn based on whether the buckle is connected or released. Therefore, a situation may arise where the apparatus falsely determines that the occupant is wearing the seat belt if the occupant is sitting on the seat, and just has the buckle of the seat belt inserted, without actually wearing the seat belt. Thus, it is difficult for the apparatus to correctly determine whether the occupant sitting on a seat in the vehicle is wearing the seat belt appropriately.

Also, the apparatus described in Patent Document 1 determines whether the seat belt is in an abnormal state, by just focusing on a time that has passed after the occupant of the vehicle has pulled out the seat belt when getting in the vehicle, until the occupant wears the seat belt (namely, the buckle is latched). Therefore, what the apparatus determines is not: whether the occupant wears the seat belt, based on whether the occupant of the vehicle has pulled out the seat belt; whether the occupant is wearing the seat belt while the vehicle is traveling; or whether the seat belt is in an abnormal state while the vehicle is traveling.

In view of the above, the present invention has an object to provide an occupant detection apparatus that can correctly determine whether an occupant of a vehicle is wearing the seat belt while the vehicle is traveling, and a seat belt abnormality determination apparatus that can promptly determine whether the seat belt is in an abnormal state while the vehicle is traveling.

SUMMARY

According to an embodiment of the present invention, an occupant detection apparatus, installed in a vehicle, including a seat belt configured to be extendable and rewindable, and to be worn by an occupant sitting on a seat of a vehicle, and a motor configured to rewind the seat belt, includes a counter electromotive force determination unit configured to determine whether a counter electromotive force is generated in the motor; and an occupant determination unit configured to determine whether the occupant sitting on the seat in the vehicle is wearing the seat belt, based on a determination result by the counter electromotive force determination unit while the vehicle is traveling.

Also, according to another embodiment of the present invention, an occupant detection apparatus, installed in a vehicle, including a seat belt configured to be extendable and rewindable, and to be worn by an occupant sitting on a seat of a vehicle, includes a pull-out determination unit configured to determine whether the seat belt is pulled out; and an occupant determination unit configured to determine whether the occupant sitting on the seat in the vehicle is wearing the seat belt, based on a determination result by the pull-out determination unit while the vehicle is traveling.

Furthermore, according to yet another embodiment of the present invention, a seat belt abnormality determination apparatus includes the occupant detection apparatus described above; a connection determination unit configured to determine whether a buckle is connected with a tongue plate of the seat belt, based on an on/off state of a buckle switch disposed in the buckle of the seat belt; and a seat belt state determination unit configured to determine whether the seat belt is in an abnormal state, based on the determination result by the occupant determination unit, and a determination result by the connection determination unit.

According to at least one of the embodiments of the present invention, it is possible to correctly determine whether an occupant of a vehicle is wearing the seat belt while the vehicle is traveling, and to promptly determine whether the seat belt is in an abnormal state while the vehicle is traveling.

BRIEF DESCRIPTION OF DRAWINGS

FIG. 3 is a flowchart of an example of a control routine executed by the system according to the present embodiment; and FIG. 4 is a determination matrix that is used by the seat belt abnormality determination apparatus according to the present embodiment.

DESCRIPTION OF EMBODIMENTS

In the following, specific embodiments of an occupant detection apparatus and a seat belt abnormality determination apparatus will be described with reference to the drawings according to the present invention.

Figure 1:
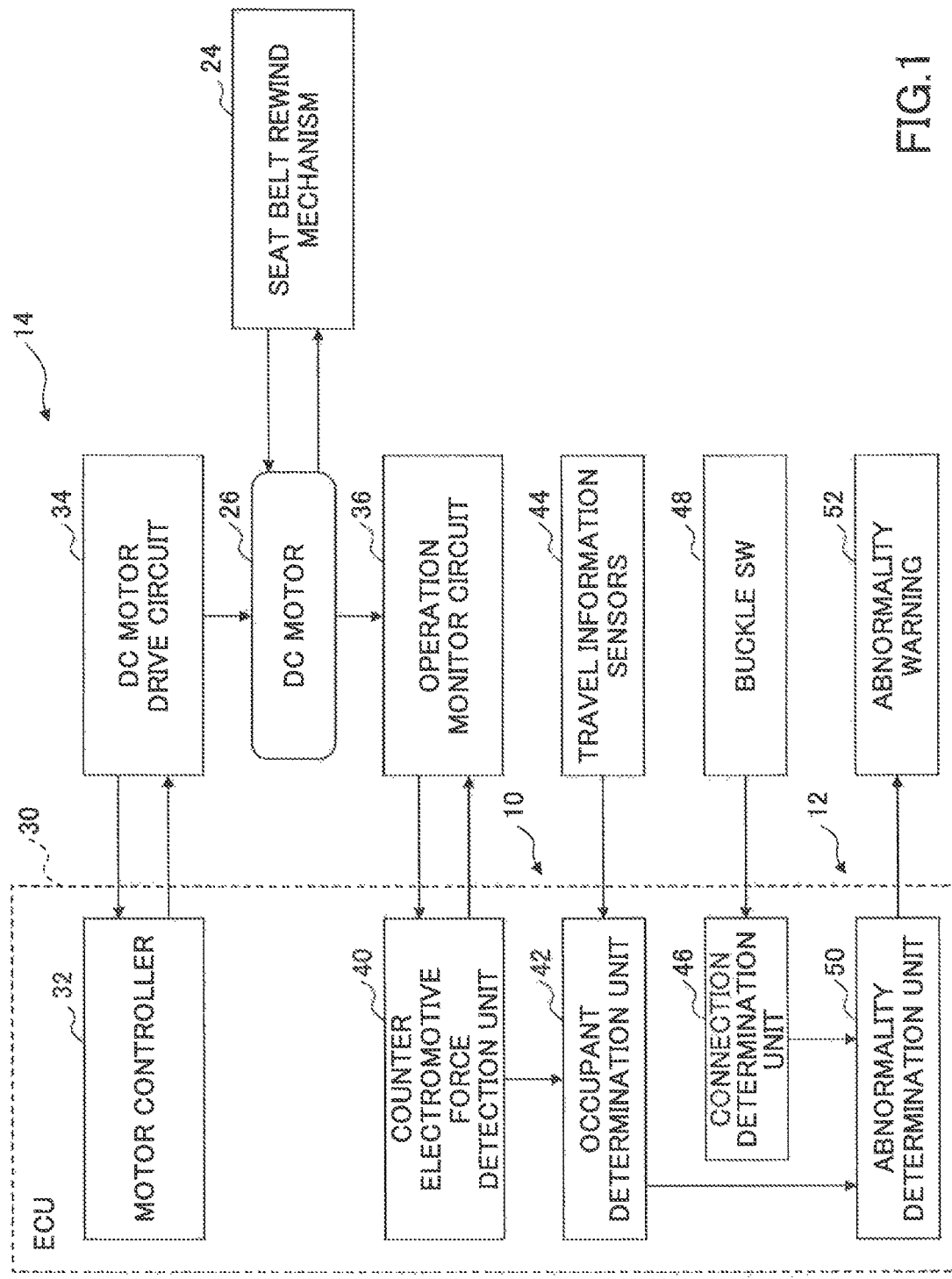
FIG. 1 is a configuration diagram of a system that includes an occupant detection apparatus and a seat belt abnormality determination. apparatus according to an embodiment of the present invention.
Figure 2:
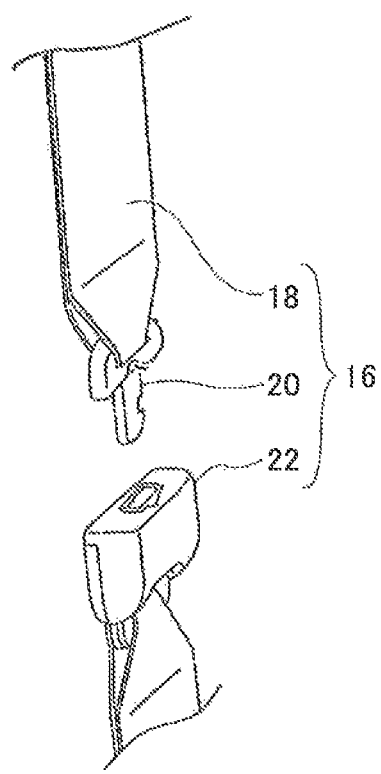
FIG. 2 illustrates an external view of a seat belt included in a vehicle that has the system installed according to the present embodiment.

FIG. 1 illustrates a configuration diagram of a system 14 that includes an occupant detection apparatus 10 and a seat belt abnormality determination apparatus 12 according to an embodiment of the present invention. Also, FIG. 2 illustrates an external view of a seat belt 16 included in a vehicle that has the system 14 installed according to the present embodiment.

The system 14 in the present embodiment is a system that is installed in a vehicle. The system 14 includes the occupant detection apparatus 10 and the seat belt abnormality determination apparatus 12. The occupant detection apparatus 10 is an apparatus that determines whether an occupant sitting on a seat in the vehicle wears a seat belt. Also the seat belt abnormality determination apparatus 12 is an apparatus that determines whether the seat belt, which is supposed to be worn by the occupant sitting on the seat in the vehicle, is in an abnormal state.

A vehicle having the system 14 installed includes the seat belt(s) 16. The seat belt 16 is a member to restrain an occupant sitting on the seat in the vehicle when the occupant wears the seat belt 16. The seat belt 16 is configured to be extendable and rewindable, namely, capable of being pulled out and shortened. The seat belt 16 includes a webbing 18, a tongue plate 20, and a buckle 22.

The webbing 18 is a belt-shaped member that contacts the body of the occupant sitting on the seat in the vehicle when restraining the occupant. The tongue plate 20 is a T-shaped plate member attached to the tip of the webbing 18. Also, the buckle 22 is a member fixed on the seat in the vehicle that has a fitting hole into which the tip of the tongue plate 20 can be inserted so that the tongue plate 20 is attachable to or detachable from the buckle 22. By connecting the tongue plate 20 with the buckle 22, the occupant sitting on the seat in the vehicle can have the seat belt 16 restrain himself/herself. Also, by releasing the connection between the tongue plate 20 and the buckle 22, the occupant can release himself/herself from the seat belt 16 that has restrained himself/herself.

The vehicle also includes seat belt rewind mechanism 24. The seat belt rewind mechanism 24 is a mechanism to rewind the seat belt 16 (specifically, the webbing 18 having the tongue plate 20 attached) that has been pulled out. The seat belt rewind mechanism 24 can generate tension on the seat belt 16 by rewinding the seat belt 16 at an operational timing, for example, when the tongue plate 20 of the seat belt 16 is connected with the buckle 22, or just before the vehicle crashes.

The vehicle also includes a direct current motor 26. The direct current motor 26 is connected with the seat belt rewind mechanism 24. The direct current motor 26 is an electric motor that generates power by rotating electrically, to generate power for the seat belt rewind mechanism 24 to rewind the seat belt 16. Thereat belt rewind mechanism 24 can rewind the seat belt 16 by using the power generated by rotation of the direct current motor 26.

The system 14 includes an electronic control unit (referred to as the "ECU" below) 30. The ECU 30 is mainly configured with a microcomputer. The ECU 30 includes a motor control unit 32 to control the direct current motor 26. The motor control unit 32 is connected with a drive circuit 34. The motor control unit 32 gives a command to the drive circuit 34 to have the direct current motor 26 rotate at a predetermined timing as described above. The drive circuit 34 is a circuit to have the direct current motor 26 rotate. In response to the command from the motor control unit 32, the drive circuit 34 has the direct current motor 26 rotate. The direct current motor 26 is driven to rotate as the drive circuit 34 operates.

The direct current motor 26 is connected with an operation monitor circuit 36. The operation monitor circuit 36 is a circuit to monitor an operational state of the direct current motor 26, and can especially monitor a counter electromotive force that is generated in the direct current motor 26. The direct current motor 26 is a motor in which a counter electromotive force is generated when the seat belt 16 is pulled out to be extended.

The ECU 30 of the system 14 also includes a counter electromotive force detection unit 40 and an occupant determination unit 42. The counter electromotive force detection unit 40 is connected with the operation monitor circuit 36 described above. The operation monitor circuit 36 supplies information indicating an operational state of the direct current motor 26, including the magnitude of the counter electromotive force, to the counter electromotive force detection unit 40. Based on the information supplied from the operation monitor circuit 36, the counter electromotive force detection unit 40 detects the magnitude of the counter electromotive force generated in the direct current motor 26, and determines whether the detected counter electromotive force satisfies a predetermined condition.

The counter electromotive force detection unit 40 is connected with the occupant determination unit 42. The counter electromotive force detection unit 40 supplies information that indicates the detected result of the counter electromotive force in the direct current motor 26, to the occupant determination unit 42. The occupant determination unit 42 is also connected with sensors and electronic control units 44 that detect travel information. of the vehicle (referred to as the "sensors" below). As the travel, information of the vehicle, for example, the sensors 44 supply information about the vehicle that includes an on state of the power switch; an on state of the ignition switch; whether the engine rotational speed is greater than or equal to a predetermined rotational speed; whether the vehicle speed is greater than or equal to a predetermined vehicle speed; and the like, to the occupant determination unit 42. As will be described in detail later, the occupant determination unit 42 determines whether the occupant sitting on a seat in the vehicle is wearing the seat belt 16, based on information supplied from the counter electromotive force detection unit 40, and information supplied from the sensors 44.

The ECU 30 also includes a connection determination unit 46. The connection determination unit 46 is connected with a buckle switch 48. The buckle switch 48 is a switch disposed in the buckle 22 that is, for example, a contact switch such as a pressure-sensitive type, or a contactless switch such as a magnetic type that uses a hole sensor. The buckle switch 48 turns on if the tip of the tongue plate 20 is inserted into a fitting hole of the buckle 22 to connect the buckle 22 with the tongue plate 20, or turns off if the connection between the buckle 22 and the tongue plate 20 is released. Based on the on/off state of the buckle switch 48, the connection determination unit 46 determines whether the buckle 22 is connected with the tongue plate 20.

Note that, for example, if the vehicle is a vehicle adopting start-stop control, and the buckle switch 48 is turned off while the vehicle stops idling, the switch may be used for inhibiting the engine from stopping idling to have the engine restart.

The ECU 30 also includes an abnormality determination unit 50. The abnormality determination unit 50 is connected with the occupant determination unit 42 and the connection determination unit 46 described above. Information that indicates a determination result by the occupant determination unit 42, and information that indicates a determination result by the connection determination unit 46, are supplied to the abnormality determination unit 50. As will be described in detail later, based on the determination result by the occupant determination unit 42 and the determination result by the connection determination unit 46, the abnormality determination unit 50 determines whether the buckle switch 48 is in an abnormal state, specifically, whether the buckle switch 48 is abnormally fixed.

The abnormality determination unit 50 is connected with an abnormality warning apparatus 52. The abnormality warning apparatus 52 is connected with the ECU 30 via an in-vehicle LAN such as a CAN. If determining that the seat belt 16 is in an abnormal state, the abnormality determination unit 50 supplies information indicating the state to the abnormality warning apparatus 52. If the information indicating that the seat belt 16 is in an abnormal state is supplied from the abnormality determination unit 50, the abnormality warning apparatus 52 stores the information in a diagnostic memory, and displays it on a meter and/or outputs it as an alarm so that the occupant of the vehicle can recognize the abnormality.

Next, with reference to FIG. 3 and FIG. 4, operations of the occupant detection apparatus 10 and the seat belt abnormality determination apparatus 12 will be described according to the present embodiment.

FIG. 3 illustrates a flowchart of an example of a control routine executed by the system 14 according to the present embodiment. Also, FIG. 4 illustrates a determination matrix that is used by the seat belt abnormality determination apparatus 12 according to the present embodiment.

In the system 14 in the present embodiment, based on information from the sensors 44, the ECU 30 has the occupant determination unit 42 determine whether the vehicle is traveling, which may make the body of the occupant sitting on a seat in the vehicle vibrate, and the seat belt 16 fluctuate (Step 100). Note that this step may be positively determined at least at timing including a period while the vehicle decelerates, during which a force is applied to the body of the occupant sitting on the seat in the vehicle to move the body forward relative to the seat in the vehicle. Consequently, if determining that the vehicle is not traveling, the ECU 30 ends the current routine without making the process proceed any further.

On the other hand, if the occupant determination unit 42 determines that the vehicle is traveling, then, the ECU 30 has the counter electromotive force detection unit 40 read a counter electromotive force generated in the direct current motor 26, based on information, from the operation monitor circuit 36 (Step 102). Then, the ECU 30 determines whether the read counter electromotive force satisfies a predetermined condition (Step 104). Specifically, the ECU 30 determines whether a state continues for a predetermined time or longer during which the read counter electromotive force is greater than or equal to a predetermined value. Note that this predetermined value and this predetermined time may be set to a value and a time, respectively, that are required for detecting by the counter electromotive force generated in the direct current motor 26, that the seat belt 16 is pulled in the forward direction of the vehicle by an inertial force applied to the body of the occupant of the vehicle due to the deceleration of the vehicle If determining at Step 104 that the counter electromotive force in the direct current motor 26 is less than the predetermined value, or the state does not continue for the predetermined time or longer during which the counter electromotive force is greater than or equal to the predetermined value, the ECU 30 ends the current routine without making the process proceed any further. On the other hand, if determining that the state continues for the predetermined time or longer during which the counter electromotive force is greater than or equal to the predetermined value, the ECU 30 has the counter electromotive force detection unit 40 supply information, to the occupant determination unit 42 that the counter electromotive force in the direct current motor 26 satisfies the predetermined condition.

Then, having determined by the occupant determination unit 42 that the vehicle is traveling, and having detected that the counter electromotive force in the direct current motor 26 satisfies the predetermined condition based on the information from the counter electromotive force detection unit 40, the ECU 30 determines that the occupant of the vehicle is sitting on the seat in the vehicle, and the occupant of the vehicle is wearing the seat belt 16.

In this way, according to the occupant detection apparatus 10 in the present embodiment, if the counter electromotive force is not generated in the direct current motor 26 while the vehicle is traveling, it is possible to determine that the occupant of the vehicle is not sitting on the seat in the vehicle, or the occupant of the vehicle is not wearing the seat belt 16. On the other hand, if the counter electromotive force is generated in the direct current motor 26 while the vehicle is traveling, it is possible to determine that the occupant of the vehicle is sitting on the seat in the vehicle, and is wearing the seat belt 16.

If the counter electromotive force is not generated in the direct current motor 26 while the vehicle is traveling, it is possible to determine the seat belt 16 is not pulled by an inertial force generated with the body of the occupant of the vehicle, and it is possible to determine that the occupant of the vehicle is not sitting on the seat in the vehicle, or the occupant of the vehicle is not wearing the seat belt 16. On the other hand, if the counter electromotive force is generated in the direct current motor 26 while the vehicle is traveling, it is possible to determine that the seat belt 15 is pulled by an inertial force generated with the body of the occupant of the vehicle, and it is possible to determine that the occupant of the vehicle is sitting on the seat in the vehicle, and is wearing the seat belt 16.

Therefore, according to the occupant detection apparatus 10 in the present embodiment, it is possible to correctly determine whether the occupant of the vehicle is wearing the seat be 16 while the vehicle is traveling.

Also, in the present embodiment, determining whether the occupant of the vehicle is wearing the seat belt 16 while the vehicle is traveling, is executed based on whether a state continues for a predetermined time or longer during which a counter electromotive force generated in the direct current motor 25 while the vehicle is traveling is greater than or equal to a predetermined value, When an inertial force is applied to the body of the occupant of the vehicle due to deceleration of the vehicle, the seat belt 16 is pulled out by a greater length, and for a longer time compared to length and time observed when the vehicle stops.

Therefore, according to the occupant detection apparatus 10 in the present embodiment, even if the counter electromotive force is generated in the direct current motor 26 as noise while the vehicle is traveling although the occupant of the vehicle is not sitting on the seat in the vehicle, it is possible to avoid determining that the occupant of the vehicle is wearing the seat belt 16. Therefore, precision of determination can be improved whether the occupant of the vehicle is wearing the seat belt 16 while the vehicle is traveling.

Also, in the present embodiment, if the ECU 30 determines by the counter electromotive force detection unit 40 that a state continues for the predetermined time or longer during which the counter electromotive force in the direct current motor 26 is greater than or equal to the predetermined value, and determines by the occupant determination unit 42 that the occupant of the vehicle is wearing the seat belt 16, the ECU 30 has the occupant determination unit 42 supply information that the occupant of the vehicle is wearing the seat belt 16, to the abnormality determination unit 50.

If the occupant determination unit 42 determines that the occupant of the vehicle is wearing the seat belt 16, then, the ECU 30 has the connection determination unit 46 read an on/off state of the buckle switch 48, and based on the on/off state of the buckle switch 46, determines whether the buckle 22 is connected with the tongue plate 20 (Step 106). The ECU 30 has the connection determination unit 46 supply the determination result to the abnormality determination unit 50.

Then, the ECU 30 has the abnormality determination unit 50 determine whether the seat belt 16 is in an abnormal state, namely, the buckle switch 48 is in an abnormal state, based on the information from the occupant determination unit 42, and the information from the connection determination unit 46 (Step 108). Specifically, as shown in FIG. 4, if detecting that the occupant of the vehicle is wearing the seat belt 16 based on the information from the occupant determination unit 42, and detecting that the buckle 22 is connected with the tongue plate 20 based on the information from the connection determination unit 46, the ECU 30 determines that the seat belt 16 (specifically, the buckle switch 48) is in a normal state. On the other hand, in this case, if detecting that the buckle 22 is not connected with the tongue plate 20 based on the information from the connection determination unit 46, the ECU 30 determines that the seat belt 16 (specifically, the buckle switch 48) is in an abnormal state.

If determining at Step 108 that the seat belt 15 is in an abnormal state, the ECU 30 supplies the information indicating the state to the abnormality warning apparatus 52, stores the abnormality in a diagnostic memory, and has the occupant of the vehicle recognize the abnormality.

In this way, according to the seat belt abnormality determination apparatus 52 in the present embodiment, based on a determination result about whether the occupant of the vehicle is wearing the seat belt 16 based on the counter electromotive force in the direct current motor 26, and a determination result about whether the buckle 22 of the seat belt 16 is connected with the tongue plate 20 based on the state of the buckle switch 48, it is possible to determine whether the seat belt 16 (specifically, the buckle switch 48) is in an abnormal state.

While the vehicle, is traveling, and it is determined that the occupant of the vehicle is wearing the seat belt 16 based on a counter electromotive force in the direct current motor 26, if the buckle switch 48 is on, it is possible to determine that no abnormality occurs with the buckle switch 48. On the other hand, if the buckle switch 48 is off even in such a circumstance, it is possible to determine that an abnormality occurs with the buckle switch 48.

Therefore, according to the seat belt abnormality determination apparatus 12 in the present embodiment, it is possible to determine whether the seat belt 16 is in an abnormal state, namely, the buckle switch 48 is in an abnormal state, while the vehicle is traveling. Also, to determine whether the buckle switch 48 is in an abnormal state, it is not necessary to wait for a timing at which the buckle switch 48 switches between off and on. Therefore, it is possible to promptly determine whether the buckle switch 48 is in an abnormal state while the vehicle is traveling.

Therefore, according to the present embodiment, for a start-stop vehicle that restarts the engine by inhibiting the engine from stopping idling when the buckle switch 48 is off while the engine stops idling, it is possible to prevent the engine from restarting when the buckle switch 48 is in an abnormal state that erroneously inhibits the engine from stopping idling. Also, to determine whether the buckle switch 48 is in an abnormal state, it is not necessary to have duplicated buckle switches 40, it is possible to lower the cost and to simplify the configuration.

Note that, in the above embodiment, the counter electromotive force detection unit 40 corresponds to a "counter electromotive force determination unit" and a "pull-out determination unit" described in the claims; the occupant determination unit 42 corresponds to an "occupant determination unit" described in the claims; the connection determination unit 46 corresponds to a "connection determination unit" described in the claims; and the abnormality determination unit 50 corresponds to a "seat belt state determination unit" described in the claims.

Incidentally, in the above embodiment, to determine that the occupant of the vehicle is wearing the seat belt 16, a counter electromotive force generated in the direct current motor 26 needs to satisfy a predetermined condition, specifically, that a state continues for a predetermined time or longer during which a counter electromotive force generated in the direct current motor 26 while the vehicle is traveling is greater than or equal to a predetermined value. However, the present invention is not limited to that, but to determine that the occupant of the vehicle is wearing the seat belt 16, it is sufficient to determine that the counter electromotive force is generated in the direct current motor 26. Therefore, the requirement may be set that a counter electromotive force generated in the direct current motor 26 takes a value over "0".

Also, in the above embodiment, the counter electromotive force generated in the direct current motor 26 is used for determining whether the seat belt 16 is puller. However, the present invention is not limited to that, but a sensor detecting that the seat belt 16 is being pulled out, or a sensor detecting tension generated on the seat belt 16 may be used.

The present application is based on and claims the benefit of priority of Japanese Priority Application No. 2014-233667, filed on Nov. 18, 2014, the entire contents of which are hereby incorporated by reference.

The invention claimed is:

1. An occupant detection apparatus, installed in a vehicle, including
a seat belt configured to be extendable and rewindable, and to be worn by an occupant sitting on a seat of a vehicle, and
a motor configured to rewind the seat belt,
the apparatus comprising:
a counter electromotive force determination unit configured to determine whether a counter electromotive force is generated in the motor; and
an occupant determination unit configured to determine whether the occupant sitting on the seat in the vehicle is wearing the seat belt, based on a determination result by the counter electromotive force determination unit while the vehicle is traveling, wherein the counter electromotive force determination unit is configured to determine whether a state continues for a predetermined time of longer during which the counter electromotive force being generated in the motor while the vehicle is traveling is greater than or equal to a predetermined value.

2. A seat belt abnormality determination apparatus, comprising:
the occupant detection apparatus, as claimed in claim 1;
a connection determination unit configured to determine whether a buckle is connected with a tongue plate of the seat belt, based on an on/off state of a buckle switch disposed in the buckle of the seat belt; and
a seat belt state determination unit configured to determine whether the seat belt is in an abnormal state, based on the determination result by the occupant determination unit, and a determination result by the connection determination unit.

3. The seat belt abnormality determination apparatus, as claimed in claim 2, wherein when the occupant determination unit determines that the occupant sitting on the seat in the vehicle is wearing the seat belt, the seat belt state determination unit determines that the buckle switch is in a normal state when the connection determination unit determines that the buckle is connected with the tongue plate; or determines that the buckle switch is in an abnormal state when the connection determination unit determines that the buckle is not connected with the tongue plate.

4. An occupant detection apparatus, installed in a vehicle, including a seat belt configured to be extendable and rewindable, and to be worn by an occupant sitting on a seat of a vehicle,
the apparatus comprising:
a pull-out determination unit configured to determine whether the seat belt is pulled out; and
an occupant determination unit configured to determine whether the occupant sitting on the seat in the vehicle is wearing the seat belt, based on a determination result by the pull-out determination unit while the vehicle is traveling,
wherein the pull-out determination unit is configured to determine whether a pull-out state continues for a predetermined time or longer while the vehicle is traveling.

* * * * *